United States Patent
Mizell et al.

(10) Patent No.: US 11,664,055 B2
(45) Date of Patent: May 30, 2023

(54) CASSETTE STORAGE UNIT

(71) Applicant: William Earl LLC, Los Angeles, CA (US)

(72) Inventors: Jesse Mizell, Van Nuys, CA (US); Tanner Cochran, Bridgeville, CA (US)

(73) Assignee: WILLIAM EARL LLC, Los Angeles, CA (US)

( * ) Notice: Subject to any disclaimer, the term of this patent is extended or adjusted under 35 U.S.C. 154(b) by 0 days.

(21) Appl. No.: 17/010,284

(22) Filed: Sep. 2, 2020

(65) Prior Publication Data
US 2022/0068316 A1     Mar. 3, 2022

(51) Int. Cl.
| | | |
|---|---|---|
| *G11B 33/02* | (2006.01) | |
| *B65D 85/10* | (2006.01) | |
| *A24F 15/01* | (2020.01) | |
| *B65D 81/36* | (2006.01) | |
| *A24F 17/00* | (2006.01) | |

(52) U.S. Cl.
CPC ............ *G11B 33/025* (2013.01); *A24F 15/01* (2020.01); *B65D 81/365* (2013.01); *B65D 85/10* (2013.01); *A24F 17/00* (2013.01); *G11B 2220/90* (2013.01)

(58) Field of Classification Search
CPC .............. G11B 23/0233; G11B 33/025; G11B 2220/90; A24F 15/01; B65D 85/672
USPC .................................................. 206/242, 457
See application file for complete search history.

(56) References Cited

U.S. PATENT DOCUMENTS

| | | | | |
|---|---|---|---|---|
| 5,372,076 A | * | 12/1994 | Solt ........................... | E05G 1/00 109/22 |
| 5,450,950 A | * | 9/1995 | Randolph ............... | A61F 6/005 206/232 |
| 5,499,714 A | * | 3/1996 | Konno ............... | G11B 23/0233 206/387.13 |
| 5,690,224 A | * | 11/1997 | Koizumi ............ | G11B 23/0233 206/387.1 |
| 6,550,614 B1 | * | 4/2003 | Onmori .............. | G11B 23/0233 206/387.13 |
| 6,598,742 B1 | * | 7/2003 | Belden, Jr. .......... | E05B 17/0062 206/1.5 |
| 2002/0046963 A1 | * | 4/2002 | Belden, Jr. ............ | E05B 47/004 206/387.11 |

* cited by examiner

*Primary Examiner* — Rafael A Ortiz
*Assistant Examiner* — Sanjidul Islam
(74) *Attorney, Agent, or Firm* — Kilpatrick Townsend & Stockton LLP

(57) ABSTRACT

A storage system includes a cassette tape case having a first portion defining a recess extending along a length of the case and a second portion that is rotatably coupled with the first portion. The second portion has two protrusions that extend into an interior of the case at a medial position. The protrusions are aligned with a longitudinal axis of the case. A storage device is insertable within the case, the storage device having a storage device body with a two sides and being generally shaped like a cassette tape. The body defines two circular apertures that extend at least partially through a thickness of the body. When the storage device is inserted within the case, each protrusion extends at least partially into a respective circular aperture. The body defines a recess extending along a length of the body and extending partially through the thickness of the body.

11 Claims, 8 Drawing Sheets

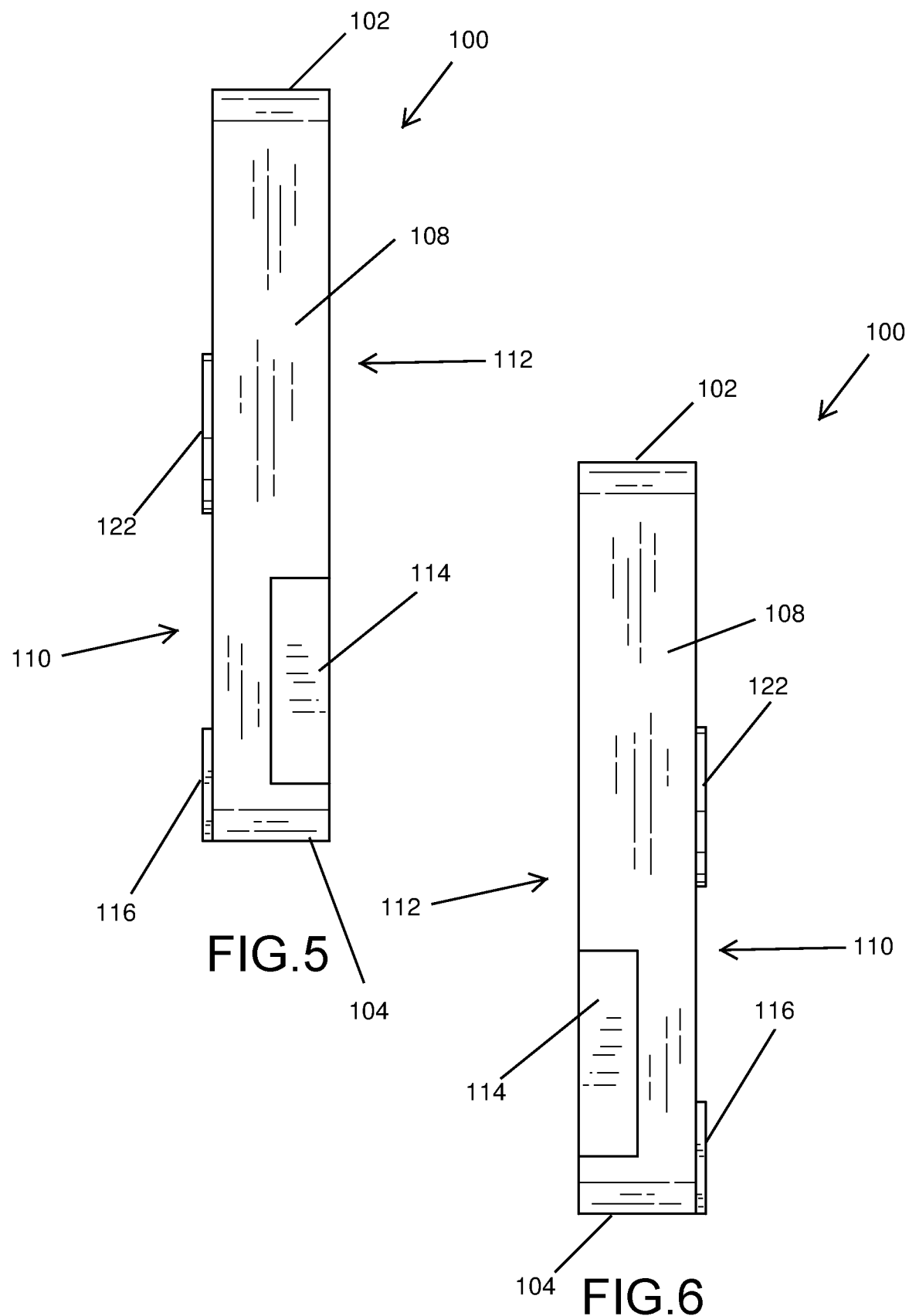

CASSETTE STORAGE UNIT

BRIEF SUMMARY OF THE INVENTION

Embodiments of the present invention are directed to storage systems that include a case and a storage device. The storage device may have a form that is generally sized and shaped to mimic an audio cassette tape, with the front face and/or rear face of the storage device defining at least one recess. The recess may provide storage space for receiving one or more objects. Once inserted into the case, such as an audio cassette case, the storage device may securely hold any objects placed within the recess.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

FIG. 5 is a right side elevational view of the storage device of FIG. 1.

FIG. 6 is a left side elevational view of the storage device of FIG. 1.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to storage devices that mimic retro devices. In particular, the storage devices are designed to have a similar size and shape as audio cassette tapes and may operate in conjunction with cases (such as cassette tape cases) to enable a user to store any number of items. For example, each storage device may include at least one storage region formed within a body of the storage unit that provides space for various items such as, but not limited to, matches, rolling papers, tobacco and/or other smoking products, lighters, and the like. While described largely in conjunction with storing smoking implements and consumables, it will be appreciated that the storage devices described herein may be used to store any number of other objects according to the desires of the user. Additionally, while described as having a size and shape matching that of a cassette tape, the storage device of the present invention may be provided in other form factors, such as microcassettes, video home system (VHS) cassette tapes, 8 track cassette tape, video game cartridges, and the like.

Figure 1:
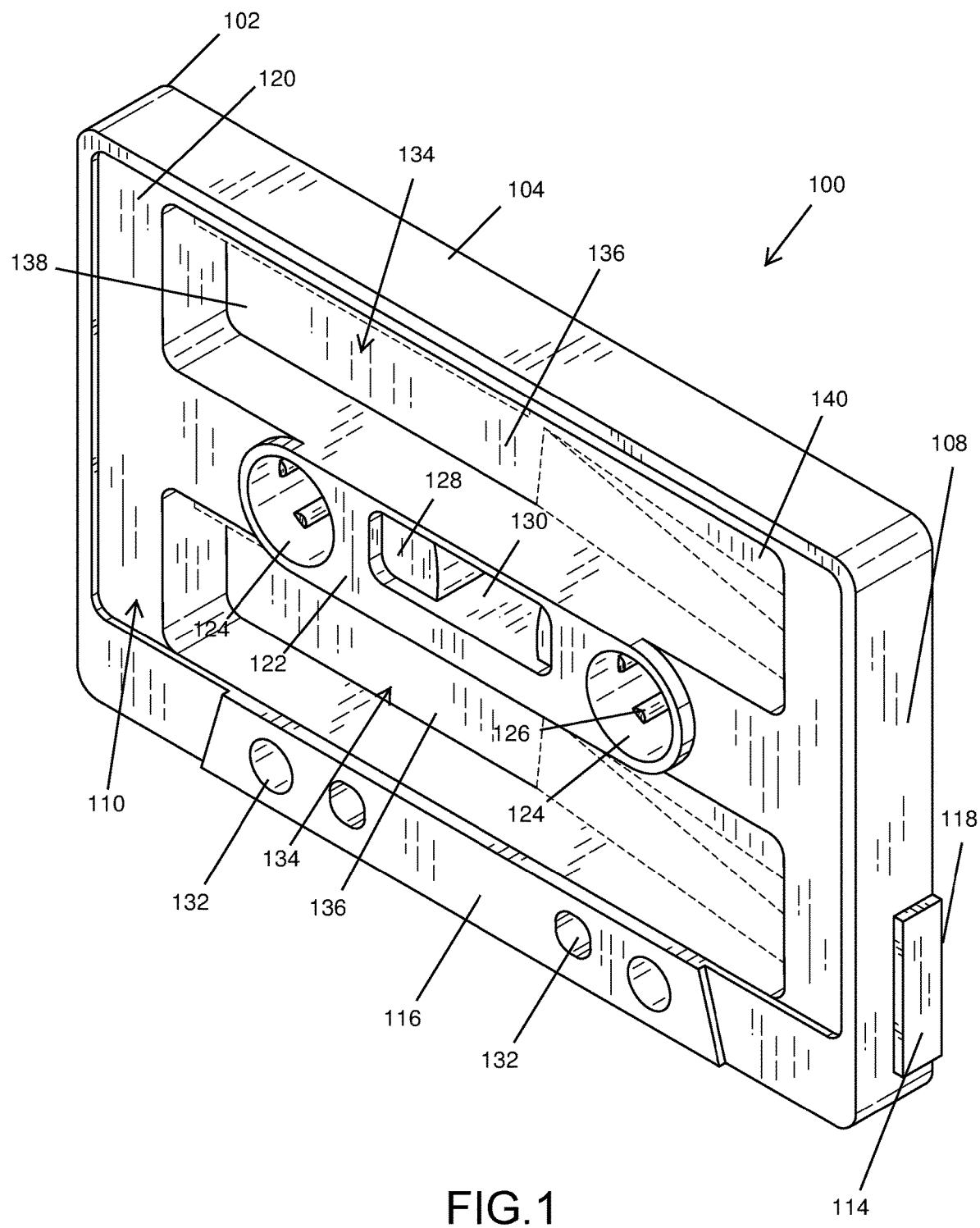
FIG. 1 is a top perspective view of a storage device according to embodiments of the present invention.
Figure 2:
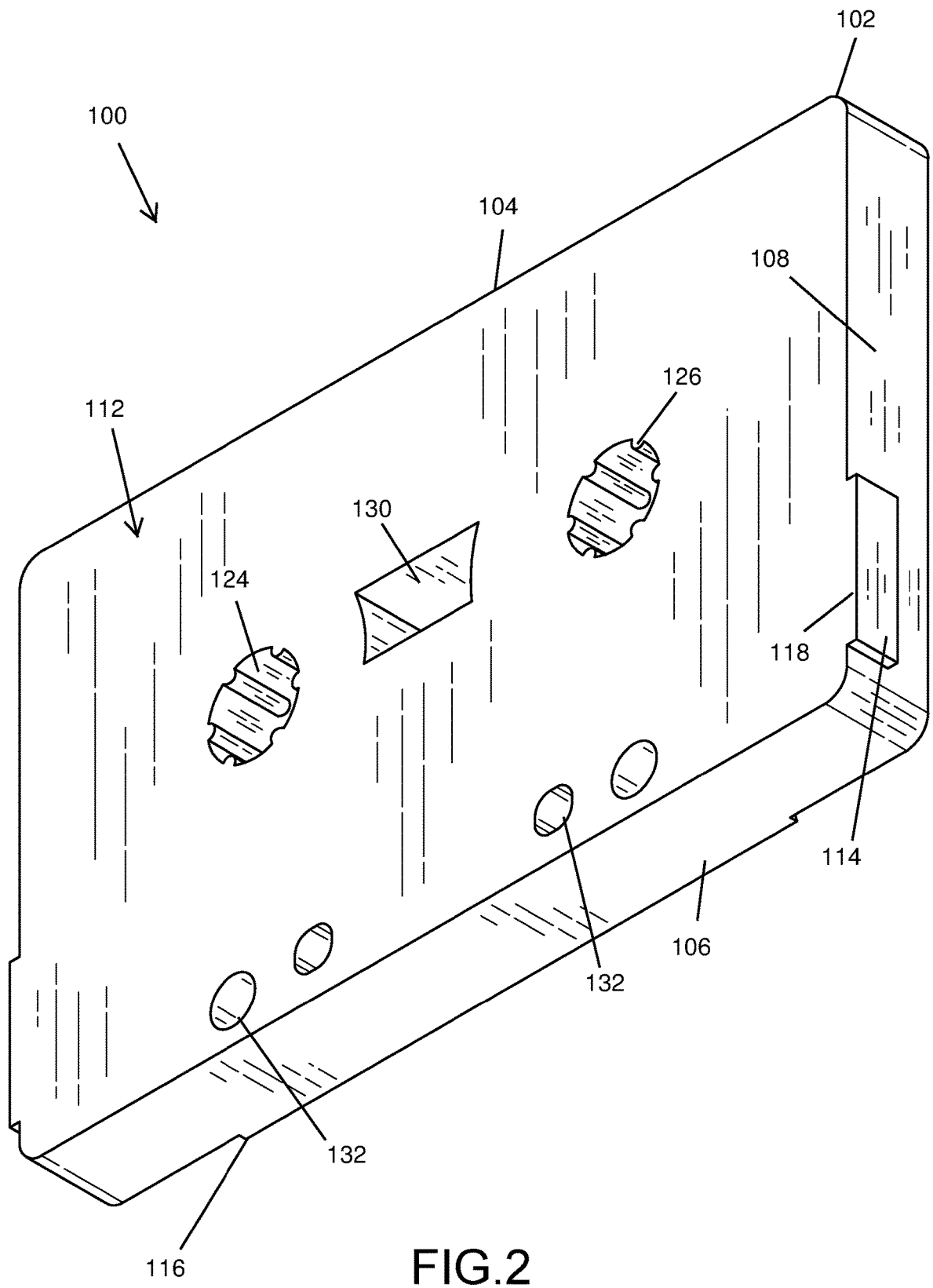
FIG. 2 is a bottom rear perspective view of the storage device of FIG. 1.
Figure 3:
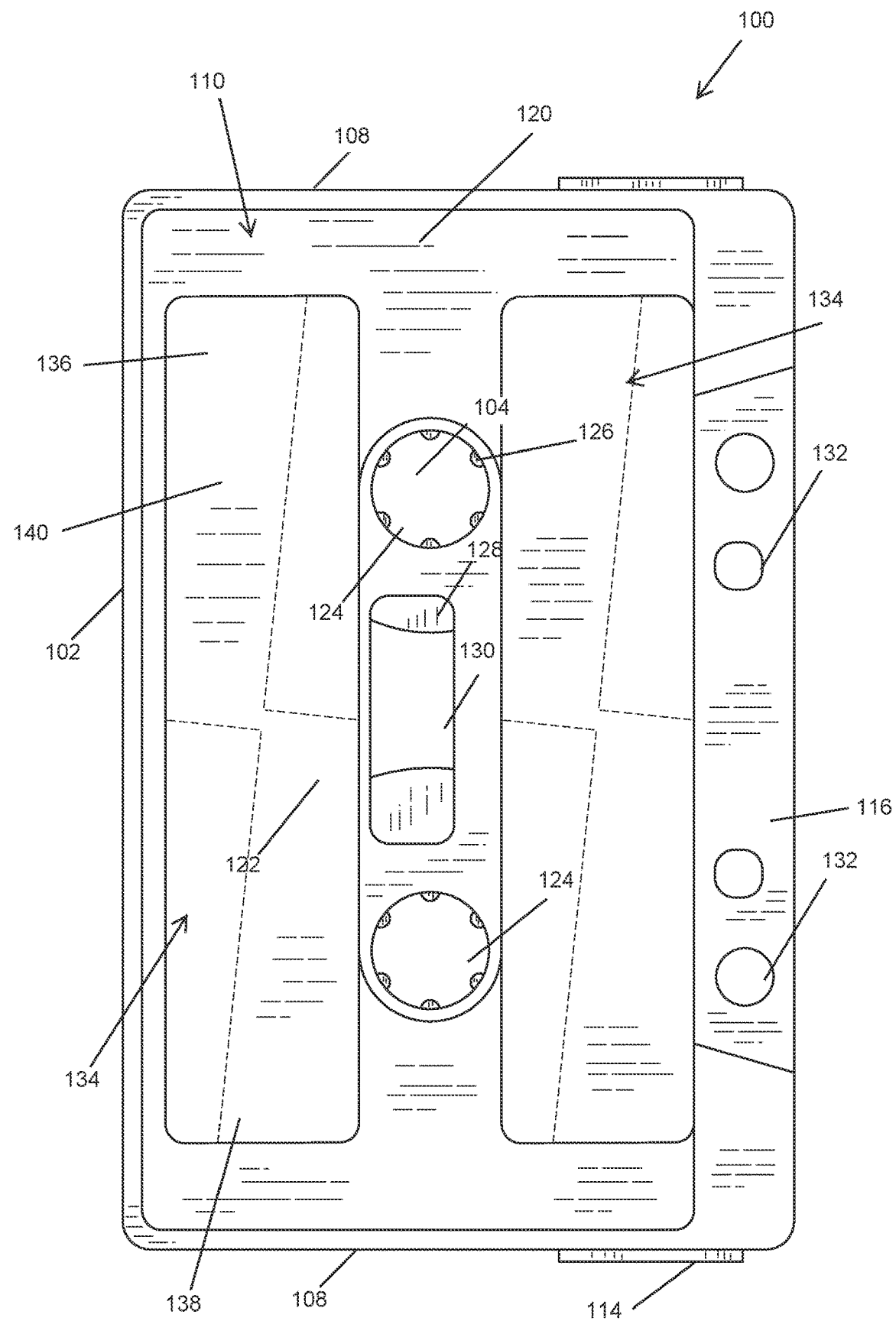
FIG. 3 is a front elevational view of the storage device of FIG. 1.
Figure 4:
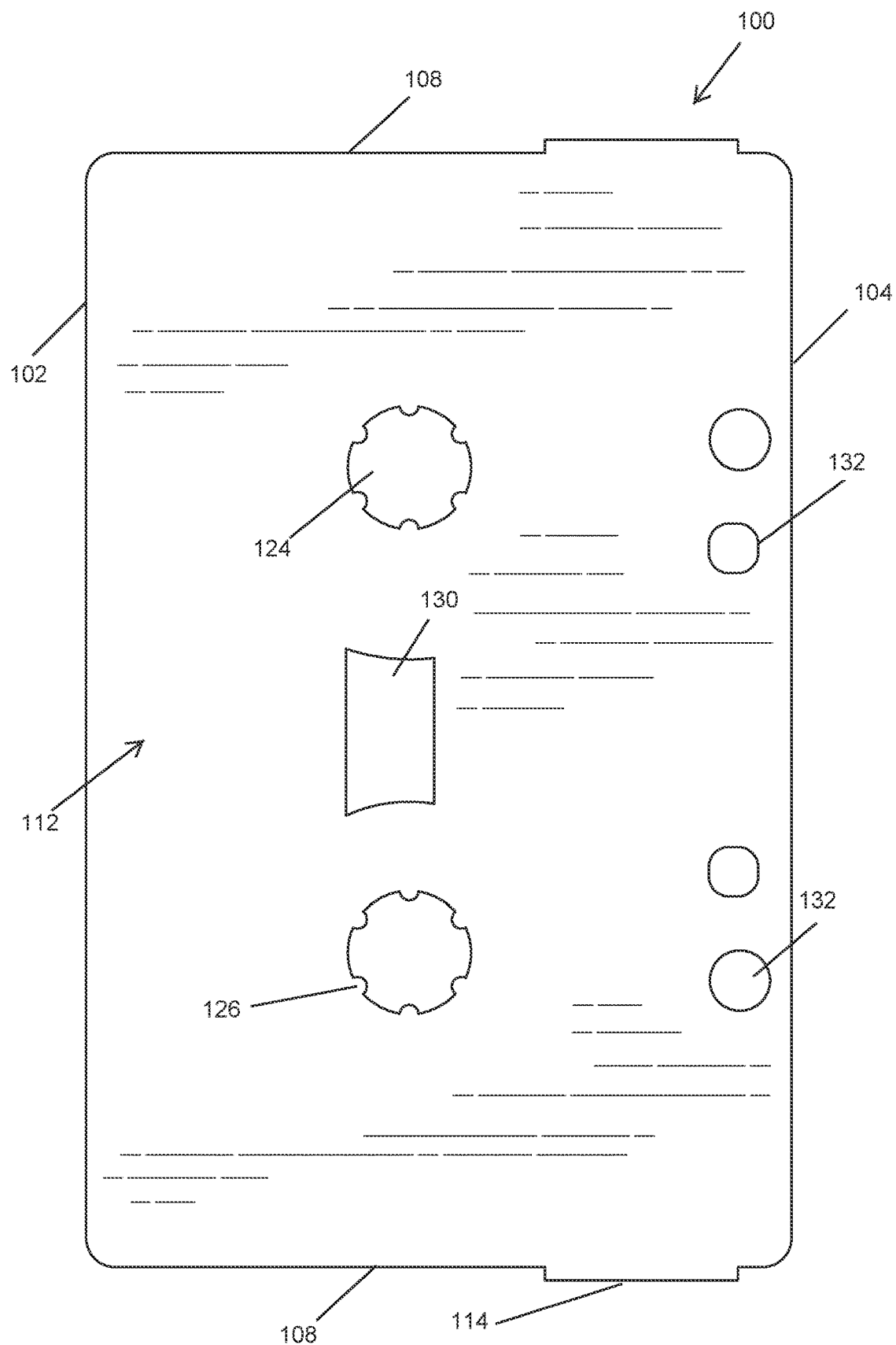
FIG. 4 is a rear elevational view of the storage device of FIG. 1.
Figures 7, 8:
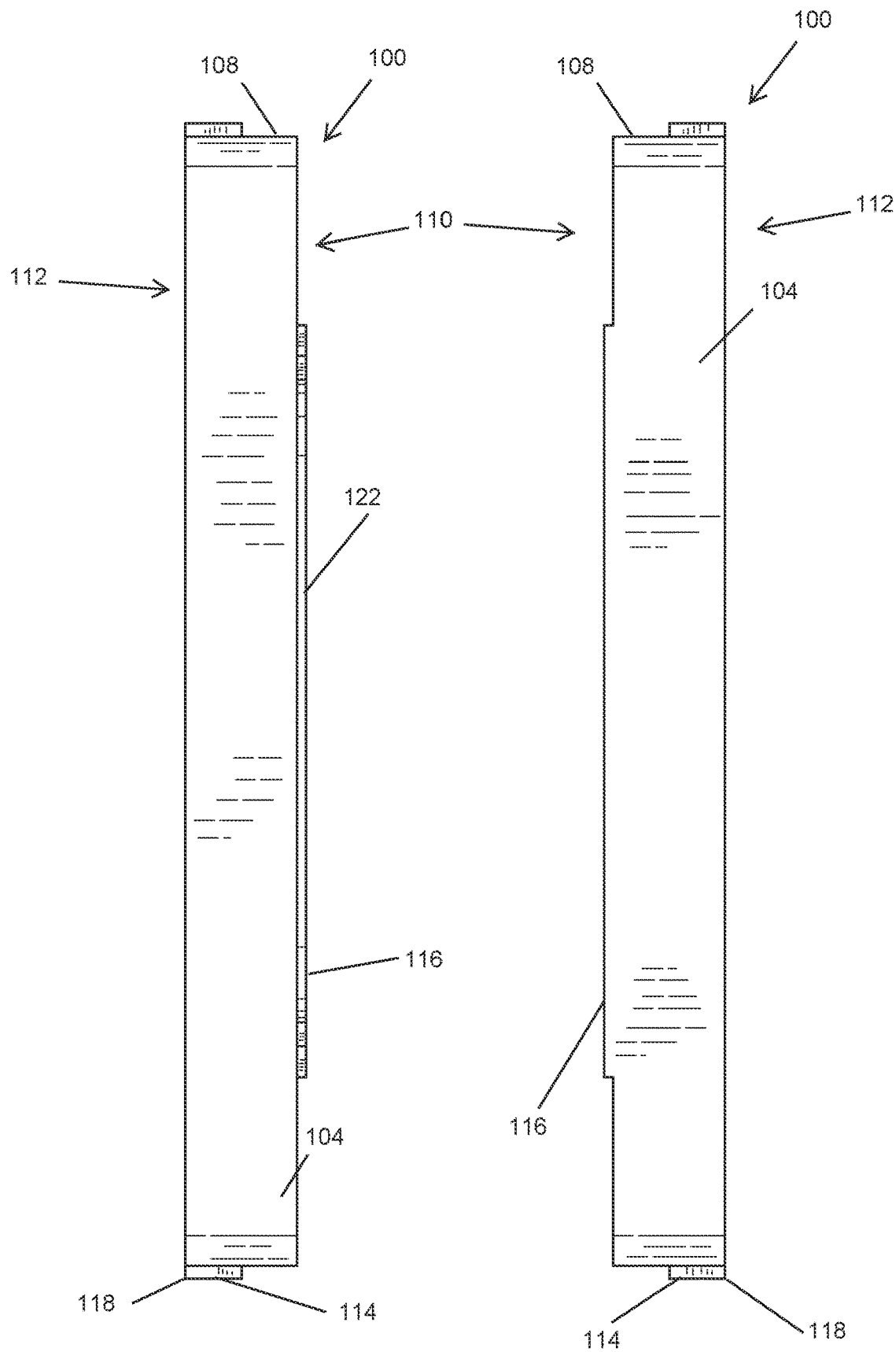
FIG. 7 is a top plan view of the storage device of FIG. 1.
FIG. 8 is a bottom plan view of the storage device of FIG. 1.

Turning now to the figures, one embodiment of a storage device 100 is depicted. As shown in FIGS. 1-8, storage device 100 is characterized by a storage device body 102. Storage device body 102 includes a top 104, bottom 106, and two lateral sides 108 that form an outer periphery of the storage device body 102. The top 104, bottom 106, and two lateral sides 108 form a generally rectangular profile shape that is typically sized and shaped to match a profile of an audio cassette tape. For example, oftentimes, corners of the generally rectangular shape may be rounded. Each of the top 104, bottom 106, and two lateral sides 108 has a length and a width, with the width of various sides of the storage device body 102 form a thickness of the storage device body 102 that separates a front face 110 and a rear face 112 from one another. As best illustrated in FIG. 2, the rear face 112 is characterized by a generally flat, planar surface, however embodiments exist where the rear face 112 includes one or more areas that protrude outward or inward form a primary surface of the rear face 112. For example, the profile of the rear face 112 may match or substantially match that of the front face 110 as will be discussed in greater detail below.

To more closely resemble an audio cassette tape, one or more sides and/or faces of the storage device body 102 may include features that mimic the structure of an audio cassette tape. For example, as shown in FIGS. 1-8 each of the lateral sides 108 of the storage device body 102 may include generally rectangular protrusions 114 that extend outward from each lateral side 108. In some embodiments, each rectangular protrusion 114 may be elongate such that longer sides of the rectangular protrusion 114 extend in parallel with the lateral sides 108. In some embodiments, a rear side of the rectangular protrusions 114 may be aligned with a rear edge of the lateral side 108 as best shown in FIGS. 2, 4, 7, and 8.

The front face 110 may include a generally trapezoidal protrusion 116 having a longest side 118 that is aligned with a bottom edge of the front face 110. The trapezoidal protrusion 116 may be centered on the front face 110 and extend along a substantial portion of the length of the front face 110. For example, the longest side 118 of the trapezoidal protrusion 116 may extend along at least 75% of the length of the front face 110 and bottom 106. This size and positioning of the trapezoidal protrusion 116 mimics the structure and width of a portion of a conventional audio cassette tape that houses a pressure pad and magnetic head. The front face 110 may also include a generally rectangular indented area 120 that extends slightly inward from peripheral portions of the front face 110. A bottom surface of the indented area 120 is positioned proximate an upper edge of the trapezoidal protrusion 116 and extends upward to an area proximate a top edge of the front face 110. Lateral edges of the indented area 120 are positioned proximate lateral edges of the front face 110. In some embodiments, the distance from each lateral edge of the indented area 120 to a respective lateral edge of the front face 110 may be the same (or approximately the same) as the distance from a top edge of the indented area 120 to a top edge of the front face 110. In other embodiments, the lateral distances and top distance may be different.

In some embodiments, a stadium-shaped protrusion 122 may be provided that extends outward from the indented area 120 at a position that is proximate a center of the front face 110. For example, the protrusion 122 have generally rectangular central portion that is capped by semicircular ends. In some embodiments, the storage device body 102 may define one or more generally circular apertures 124 that extend all or part way through a thickness of the storage device body 102. In some embodiments, apertures 124 may be coaxial with the semicircular ends of the protrusion 122 such that the apertures 124 extend through the protrusion 122. These apertures 124 may be arranged along a longitudinal axis of the storage device body 102 and may be sized, shaped, and positioned to mimic the winding/unwinding apertures of a conventional audio cassette tape. For example, central axes of the apertures 124 may be approximately 1.685 inches apart (oftentimes between about 1.5 inches and 1.85 inches), while each aperture 124 may have a diameter of approximately 0.409 inches (oftentimes between about 0.35 and 0.5 inches).

In some embodiments, a number of radial protrusions 126 may extend into a center of each aperture 124. As illustrated, six radial protrusions 126 are provided for each aperture 124. The radial protrusions 126 may be arranged at regular angular intervals within each aperture 124 and/or may be arranged at irregular intervals. As best illustrated in FIGS. 1 and 2, the radial protrusions 126 may extend from the rear face 112 toward the front face 110. In some embodiments, the radial protrusions 126 may taper and/or terminate prior to reaching the front face 110. However, in other embodiments, different designs of radial protrusions 126 may be used. For example, the radial protrusions 126 may extend from the front face 110 toward the rear face 112 without reaching the rear face 112. In other embodiments, the radial protrusions 126 may extend entirely between the front face 110 and the rear face 112. In yet other embodiments, the radial protrusions 126 may be disposed only in a medial portion of each aperture 126, without any portion of the radial protrusions 126 contacting either the front face 110 or the rear face. In some embodiments, rather than tapering, each radial protrusion 126 may have a generally uniform cross-section. The cross-section may be generally rectangular in some embodiments, while in other embodiments cross-section may be other shapes, such as triangular, semicircular, semielliptical, etc.

In some embodiments, the protrusion 122 may further define a central indentation 128 and/or aperture 130. As illustrated, the central indentation 128 serves to mimic a viewing window of a conventional audio cassette tape that enables a user to view a relative amount of tape on each spool of the cassette. For example, the aperture 130 may mimic the viewable spacing between sections of tape wrapped around each reel of an audio cassette tape, with lateral walls of the aperture 130 being rounded to mimic tape wrapped around spools of a cassette tape. Together, the central indentation 128 and aperture 130 lend the appearance of tape and reels of a cassette tape to the storage device body 102.

In some embodiments, the storage device body 102 may include additional features that mimic those found in traditional audio cassette tapes. For example, the trapezoidal projection 116 may define a number of apertures 132 that mimic various apertures of cassette tapes, such as capstan and pinch roller openings. For example, a pair of generally circular openings may be positioned below and laterally outward from a pair of generally rectangular openings with rounded corners. The circular openings may have diameters of between about 0.15 and 0.25 inches (oftentimes about 0.199 inches) and the centers of the circular openings may be spaced apart from one another by about 1.75 to 2.0 inches (oftentimes about 1.9 inches). The generally rectangular openings may have sizes that are between approximately 0.135 and 0.160 inches (with about 0.145 inches being common) and the centers of the rectangular openings may be between approximately 1.0 and 1.25 inches apart (with about 1.1 inches being common). While not illustrated, it will be appreciated that additional features may be included that mimic features of audio cassettes. For example, the bottom 106 may define one or more apertures or recesses that mimic tape read openings of a cassette tape, a write-protect tab, and/or other features of a cassette tape.

The storage device body 102 further defines at least one storage space. For example, the front face 110 and/or rear face 112 may define one or more recesses 134 that extend partially through the thickness of the storage device body 102. As illustrated, the front face 110 defines two recesses 134 that extend along a length of the storage device body 102. Here, the two recesses 134 are positioned on either side of the protrusion 122 and central apertures 124 such that each of a top half and a bottom half of the storage device body 102 each include at least one storage space. For example, the top recess 134 may be disposed between the protrusion 122 and a top edge of the front face 110, while the bottom recess 134 is disposed between the protrusion 122 and the trapezoidal protrusion 116. As illustrated, each recess 134 has a generally rectangular periphery, however any shape of periphery may be used in various embodiments. In some embodiments, one or both of the recesses 134 may include a generally flat base 136, while in other embodiments, the base 136 may be sloped and/or have one or more sections. For example, the base 136 of one or more of the recesses 134 may be divided into two or more sections. As illustrated, each recess 134 is divided into a first section 138 and a second section 140. Here, the first section 138 and the second section 140 each have a generally irregular trapezoidal shape. The first section 138 and second section 140 may be oriented in opposite directions. For example, the first section 138 of each recess 134 is widest at a leftmost position and tapers to a narrowest point at a rightmost position, while the second section 140 of each recess 134 is widest at a rightmost position and tapers to a narrowest position at a leftmost position. While shown with the second section 140 being positioned above the first section 138, it will be appreciated that the positions may be reversed in some embodiments.

In some embodiments, a base of each of the first section 138 and the second section 140 may be sloped. The bases of sections 138, 140 may be sloped in the same direction and/or in opposing directions. For example, a base of the first section 138 may taper upward from left to right, while a base of the second section may taper upward from right to left. In some embodiments, a maximum depth of each of the first section 138 and the second section 140 may be at least 50%, 55%, 60%, 65%, 70%, 75%, etc. of the thickness of the storage device body 102, however any maximum depth is possible. The minimum depth of each of the first section 138 and the second section 140 may be less than 50%, 45%, 40%, 35%, 30%, 25%, etc. of the thickness of the storage device body 102. While illustrated with the first section 138 and the second section 140 having the same minimum and maximum depths, the sections 138, 140 may have different depths.

It will be appreciated that in various embodiments, any number, size, and/or arrangement of recesses 134 may be included on a storage device 100. For example, a single recess 134 may be provided at a single location on one of the faces of the storage device body 102. In some embodiments, one or more recesses 134 may be vertically aligned, rather than horizontally aligned as shown here. Such arraignments may enable storage devices 100 that include four recesses 134 arranged in a rectangular pattern about one of the faces 110, 112 of the storage device body 102. In some embodiments, a single annular recess 134 may be provided that extends entirely about the protrusion 122. Additionally, while shown with recesses 134 formed in only a single face (front face 110 or back face 112), some embodiments may include recesses 134 formed on both the front face 110 and the rear face 112.

The storage device 100 may be formed of any suitable material, such as plastics, glass, metal, wood, ceramics, etc. The storage device 100 may be transparent and/or opaque. The storage device 100 may be formed as a single integral piece or may be formed from any number of components that are assembled to form the final storage device 100. As just one example, two halves (one including the front face 110 and one including the rear face 112) may be coupled together. The various pieces of the storage device 100 may be coupled in any number of ways, such as using connectors (such as snaps or other fasteners), adhesives, RF welding, and/or any other mechanical coupling mechanism. In some embodiments, the storage device 100 (or components thereof) may be formed by carving, injection molding, 3D printing, casting, and/or other fabrication techniques.

While illustrated here with entirely stationary components, it will be appreciated that in some embodiments, one or more of the components may be movable. For example, rather than having a central indentation 128 and aperture 130 to lend the appearance of tape and reels of a cassette tape to the storage device body 102, the storage device 100 may include spools or reels that are moveable relative to the storage device body 102. Other variations are possible. For example, in some embodiments, the storage device 100 may be a playable cassette tape, with magnetic tape being used to store data, such as audio recordings, and being wound about moveable reels that may be played using a cassette player. The playable cassette tape may include recesses 134.

Figure 9:
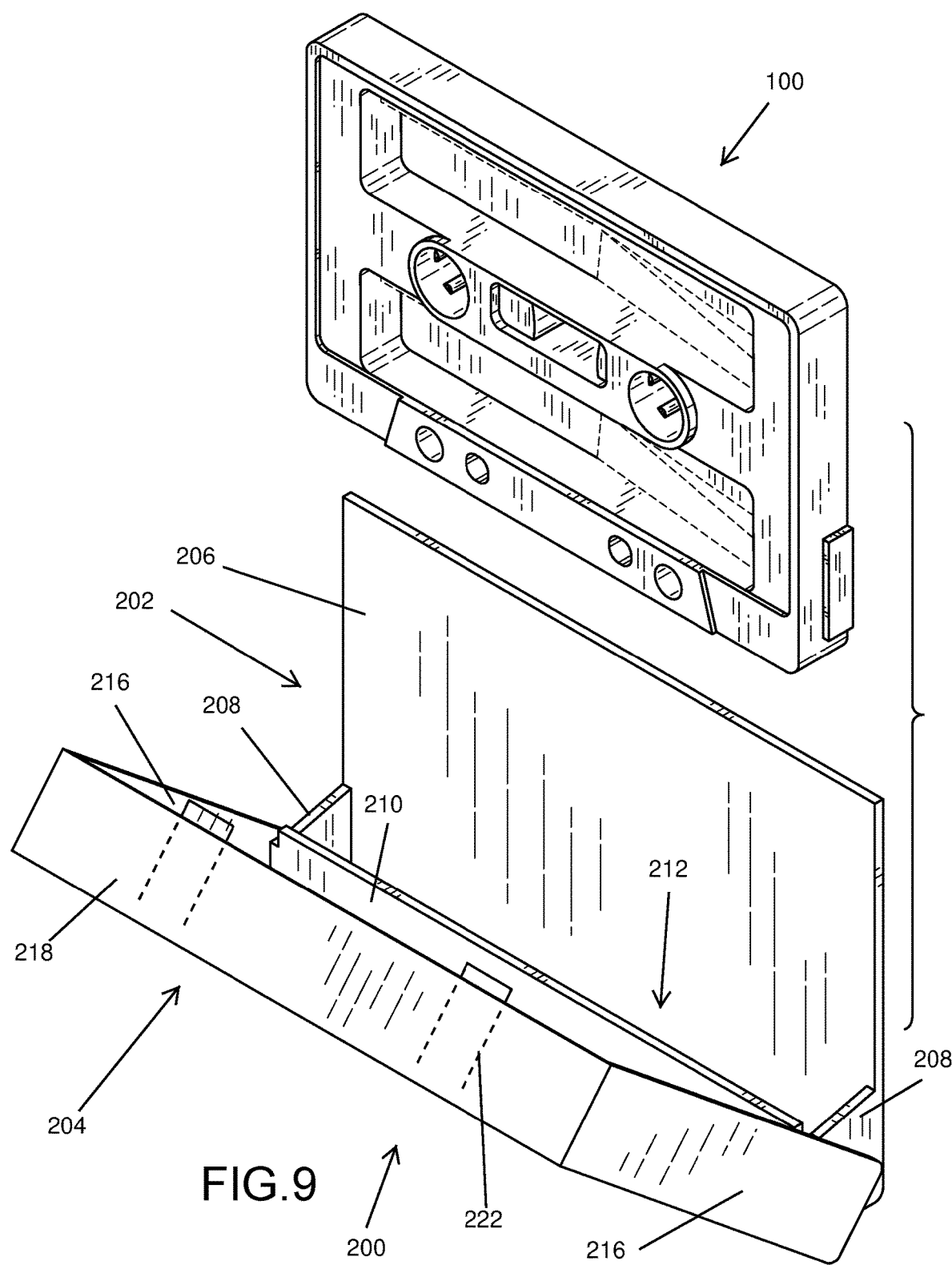
FIG. 9 illustrates the storage device of FIG. 1 external to an open audio cassette case.

As the storage spaces of the storage device 100 are typically uncovered, it is often desirable to use the storage device 100 along with an additional case. For example, as illustrated in FIG. 9 the storage device 100 may be used in conjunction with a conventional audio cassette case 200. The audio cassette case 200 may include a first portion 202 and a second portion 204 that are rotatably coupled with one another to open and close the audio cassette case 200 for removal and insertion of the storage device 100. The first portion 202 may include a primary surface 206 that is coupled with a number of sidewalls 208, an opposing face 210, and an end (not shown), which may all be formed integrally as a single unit. The sidewalls 208 and opposing face 210 extend along an entire length of the primary surface 206 while extending only partially along a height of the primary surface 206. Together, the sidewalls 208, opposing face 210, end, and a lower portion of the primary surface 206 define a recess 212. Recess 212 has an open top end that faces an interior of the audio cassette case 200 and that is sized and shaped to receive a base of the storage device 100.

Figure 10:
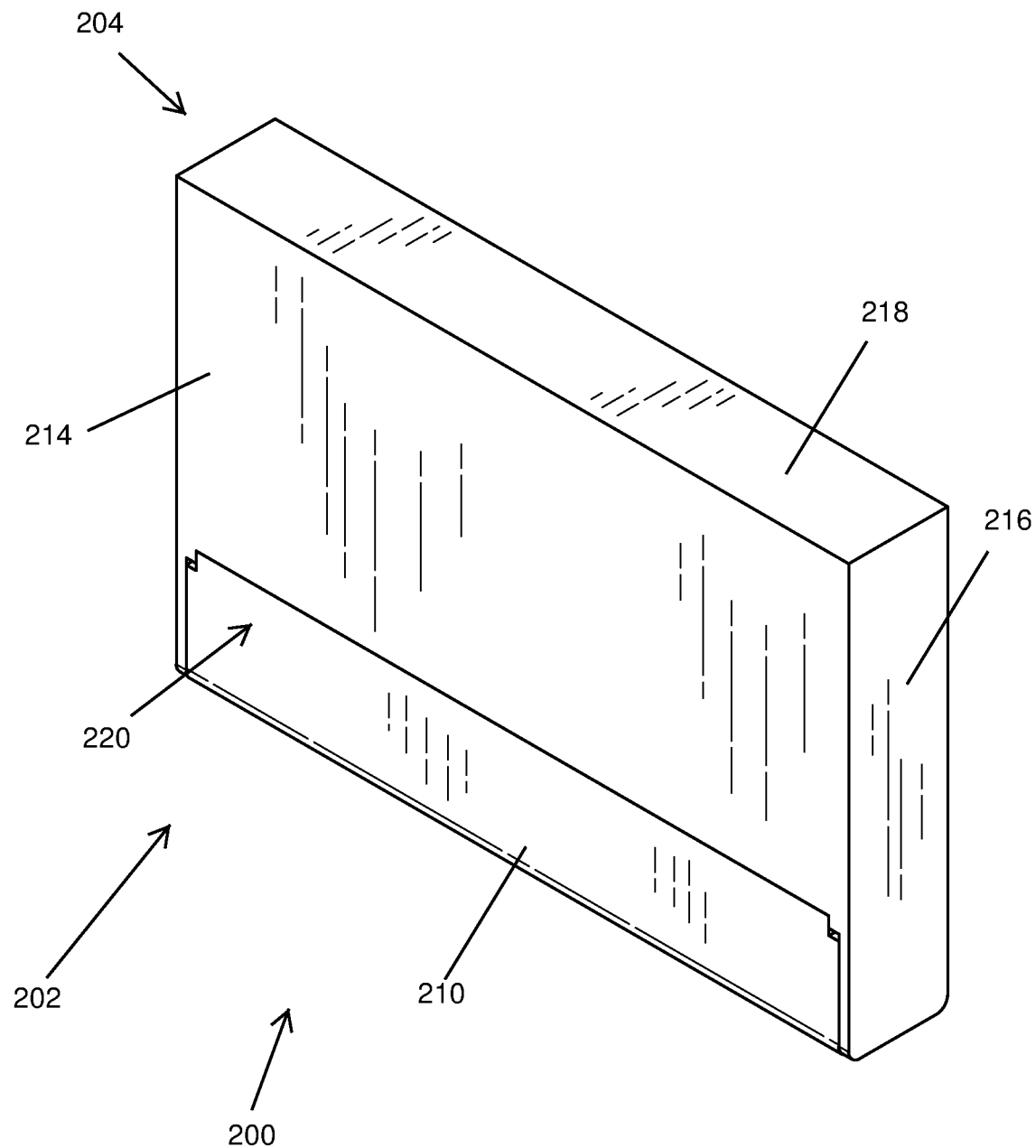
FIG. 10 illustrates the audio cassette case of FIG. 9 in a closed position.

The second portion 204 of the audio cassette case 200 is rotatably coupled with the first portion 202. The second portion 204 may include a primary surface 214, with the primary surface 214 being coupled with two sidewalls 216 and a top end 218. The various portions of the second portion 204 may be formed integrally as a single unit. The primary surface 214 may define a cutout portion 220, which may have a size and shape that generally matches that of the opposing face 210 of the first portion 202. This enables the opposing face 210 and the primary surface 214 to be generally aligned and flush with one another along a single plane when the audio cassette case 200 is closed as illustrated in FIG. 10. In some embodiments, the second portion 204 may include two protrusions 222 that extend into an interior of the audio cassette case 200 at a medial position of the audio cassette case 200. The protrusions 222 may be similar to those used in known audio cassette cases and may be aligned with a longitudinal axis of the audio cassette case 200. The protrusions 222 may be configured to be inserted within the apertures 124 of the storage device 100 to help maintain the storage device 100 at a set position within the audio cassette case 200. It will be appreciated that the first portion 202 and/or second portion 204 of the audio cassette case 200 may be opaque or transparent.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A storage system, comprising:
   a cassette tape case comprising:
   a first portion and a second portion that are rotatably coupled with one another, the first portion defining a recess and the second portion comprising at least one protrusion extending into an interior of the cassette tape case at a medial position of the cassette tape case; and
   a storage device that is insertable within the cassette tape case, the storage device comprising a storage device body, wherein:
   the storage device body defines at least one generally circular aperture that extends at least partially through a thickness of the storage device body;
   the storage device body defines at least one recess extending along a length of the storage device body;
   the at least one recess extends partially through the thickness of the storage device body;
   the at least one recess is divided into multiple storage regions;
   a bottom surface of each of the multiple regions is sloped in a different direction; and
   opposing ends of the at least one recess extend beyond the at least one generally circular aperture.

2. The storage system of claim 1, wherein:
   at least a portion of the at least one recess extends at least 50% into the thickness of the storage device body.

3. The storage system of claim 1, wherein:
   the at least one recess has a generally rectangular outer periphery.

4. The storage system of claim 1, wherein:
   the storage device body is generally shaped like a cassette tape.

5. The storage system of claim 1, wherein:
   a front surface of the storage device body has a different surface design than a rear surface of the storage device body.

6. A storage device, comprising:
   a storage device body that is generally rectangular, the storage device body being characterized by a first face and a second face, wherein:
   the storage device body defines two generally circular apertures that extend at least partially through a thickness of the storage device body from at least one of the first face and the second face;
   the generally circular apertures are aligned with one another along a longitudinal axis of the storage device body;
   the storage device body defines at least one recess extending along a length of the storage device body, the at least one recess extending partially through the thickness of the storage device body and through the first face, wherein the at least one recess defines a storage space;
   at least a portion of a bottom surface of the at least one recess slopes from a first depth to a second depth;
   the bottom surface of the at least one recess comprises a first section that slopes downward in a first direction and a second section that slopes downward in a second direction opposite the first direction; and
   opposing ends of the at least one recess extend beyond the two circular apertures.

7. The storage device of claim 6, wherein:
   the storage device body is generally shaped like a cassette tape.

8. The storage device of claim 6, wherein:
   the at least one recess comprises a generally rectangular outer periphery.

9. The storage device of claim 6, wherein:
   an outer periphery of each of the first section and the second section has a generally trapezoidal shape.

10. The storage device of claim 6, wherein:
    the first depth extends less than halfway through the thickness of the storage device body; and
    the second depth extends at least 75% through the thickness of the storage device body.

11. The storage device of claim 6, wherein:
    the at least one recess comprises a first recess and a second recess; and
    the first recess and the second recess are positioned on opposite sides of the generally circular apertures.

* * * * *